(12) United States Patent
Roberge

(10) Patent No.: US 10,119,475 B2
(45) Date of Patent: Nov. 6, 2018

(54) GAS TURBINE ENGINE GEARED ARCHITECTURE

(71) Applicant: United Technologies Corporation, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 477 days.

(21) Appl. No.: 14/767,050

(22) PCT Filed: Jan. 24, 2014

(86) PCT No.: PCT/US2014/012957
§ 371 (c)(1),
(2) Date: Aug. 11, 2015

(87) PCT Pub. No.: WO2014/126696
PCT Pub. Date: Aug. 21, 2014

(65) Prior Publication Data
US 2015/0377144 A1 Dec. 31, 2015

Related U.S. Application Data

(60) Provisional application No. 61/764,035, filed on Feb. 13, 2013.

(51) Int. Cl.
*F02C 7/36* (2006.01)
*F02C 3/073* (2006.01)

(52) U.S. Cl.
CPC .............. *F02C 7/36* (2013.01); *F02C 3/073* (2013.01)

(58) Field of Classification Search
CPC .................................. F02C 7/36; F02C 3/073
See application file for complete search history.

(56) References Cited

U.S. PATENT DOCUMENTS

| | | | |
|---|---|---|---|
| 4,005,575 A * | 2/1977 | Scott | F02C 9/18 415/61 |
| 8,292,570 B2 | 10/2012 | Suciu et al. | |
| 2006/0272313 A1 | 12/2006 | Eick et al. | |
| 2007/0084188 A1 | 4/2007 | Orlando et al. | |
| 2007/0087892 A1 | 4/2007 | Orlando et al. | |
| 2008/0022653 A1 * | 1/2008 | Schilling | F02C 7/36 60/226.1 |

(Continued)

FOREIGN PATENT DOCUMENTS

| | | | | |
|---|---|---|---|---|
| EP | 2009269 | 12/2008 | | |
| EP | 2233721 | 9/2010 | | |
| GB | 2226599 A * | 7/1990 | | F02C 3/067 |

OTHER PUBLICATIONS

International Preliminary Report on Patentability for PCT Application No. PCT/US2014/012957, dated Aug. 27, 2015.

(Continued)

*Primary Examiner* — Patrick Maines
(74) *Attorney, Agent, or Firm* — Carlson, Gaskey & Olds, P.C.

(57) ABSTRACT

A gas turbine engine assembly according to an exemplary aspect of the present disclosure includes, among other things, a geared architecture configured to rotatably couple a turbine and a compressor of an engine to rotate the compressor at a different speed than the turbine and a fan.

17 Claims, 6 Drawing Sheets

(56) References Cited

U.S. PATENT DOCUMENTS

| | | | |
|---|---|---|---|
| 2008/0060341 A1* | 3/2008 | Loisy | F02C 3/113 60/226.1 |
| 2008/0098714 A1* | 5/2008 | Orlando | F02C 7/36 60/226.1 |
| 2008/0120839 A1* | 5/2008 | Schilling | F02C 3/107 29/888.02 |
| 2009/0000270 A1* | 1/2009 | Kupratis | F02K 3/077 60/224 |
| 2009/0074565 A1* | 3/2009 | Suciu | F02C 3/113 415/122.1 |
| 2010/0154384 A1 | 6/2010 | Schilling | |
| 2010/0223904 A1* | 9/2010 | Edwards | F02C 3/067 60/224 |
| 2011/0225977 A1 | 9/2011 | Kim et al. | |
| 2012/0213628 A1 | 8/2012 | McCune et al. | |
| 2012/0237334 A1 | 9/2012 | McCune et al. | |
| 2012/0237335 A1 | 9/2012 | McCune et al. | |
| 2013/0000323 A1* | 1/2013 | Kupratis | F02C 7/36 60/801 |
| 2013/0327060 A1* | 12/2013 | Christians | F02C 7/36 60/805 |
| 2018/0003112 A1* | 1/2018 | Kupratis | F02K 3/072 |

OTHER PUBLICATIONS

European Search Report for Application No. 14751728.8 dated Sep. 6, 2016.
International Search Report and Written Opinion for International Application No. PCT/US2014/012957 completed on May 20, 2014.

* cited by examiner

GAS TURBINE ENGINE GEARED ARCHITECTURE

BACKGROUND

A gas turbine engine typically includes a fan section, a compressor section, a combustor section, and a turbine section. Air entering the compressor section is compressed and delivered into the combustion section where it is mixed with fuel and ignited to generate a high-temperature exhaust gas flow. The high-temperature exhaust gas flow expands through the turbine section to drive the compressor and the fan section. The compressor section typically includes at least low and high pressure compressors, and the turbine section typically includes at least low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different and typically slower than the turbine section so as to provide a reduced part count approach for increasing the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures utilized to drive the fan have improved propulsive efficiency, turbine engine manufacturers continue to seek further improvements to engine performance including improvements to thermal, transfer, and propulsive efficiencies.

SUMMARY

A gas turbine engine assembly according to an exemplary aspect of the present disclosure includes, among other things, a geared architecture configured to rotatably couple a turbine and a compressor of an engine to rotate the compressor at a different speed than the turbine and a fan.

In a further non-limiting embodiment of the foregoing gas turbine engine, the geared architecture is a first geared architecture, and the engine further includes a second geared architecture configured to rotatably couple to the fan to rotate the fan at a different speed than a spool that drives the fan.

In a further non-limiting embodiment of either of the foregoing gas turbine engines, the geared architecture is axially upstream from the compressor relative to a direction of flow through the engine.

In a further non-limiting embodiment of any of the foregoing gas turbine engines, the geared architecture the engine has a three spool architecture, and the turbine is an intermediate turbine.

In a further non-limiting embodiment of any of the foregoing gas turbine engines, the geared architecture of the turbine is a high pressure turbine.

In a further non-limiting embodiment of any of the foregoing gas turbine engines, the high pressure turbine is rotatably coupled to a high pressure compressor.

In a further non-limiting embodiment of any of the foregoing gas turbine engines, the engine has a three spool architecture.

In a further non-limiting embodiment of any of the foregoing gas turbine engines, the turbine is a low pressure turbine.

In a further non-limiting embodiment of any of the foregoing gas turbine engines, the low pressure turbine is rotatably coupled to the fan.

In a further non-limiting embodiment of any of the foregoing gas turbine engines, the compressor is an intermediate compressor.

In a further non-limiting embodiment of any of the foregoing gas turbine engines, the geared architecture is configured to rotate the compressor at a faster rotational speed than the turbine.

A gas turbine engine assembly according to another exemplary aspect of the present disclosure includes, among other things, a fan section; a turbine section; a compressor section; and a geared architecture rotatably coupling the compressor section and the turbine section to drive the compressor section at a different rotational speed than the turbine section and the fan section.

In a further non-limiting embodiment of the foregoing gas turbine engine, the geared architecture is a first geared architecture, and the engine further includes a second geared architecture configured to rotatably couple to the fan section to rotate the fan section at a different speed than a spool driving the fan section.

In a further non-limiting embodiment of either of the foregoing gas turbine engines, the engine has a three spool architecture, and the turbine section is an intermediate turbine.

In a further non-limiting embodiment of any of the foregoing gas turbine engines, the turbine section is a high pressure turbine section configured to rotatably drive a high pressure compressor section.

In a further non-limiting embodiment of any of the foregoing gas turbine engines, the turbine section is a low pressure turbine section configured to rotatably drive the fan section.

In a further non-limiting embodiment of any of the foregoing gas turbine engines, the geared architecture is configured to rotate the compressor section at a faster rotational speed than the turbine section.

A method of adjusting rotational speeds within a gas turbine engine includes among other things, providing a geared architecture that rotatably couples a turbine and a compressor of an engine to rotate the compressor at a different rotational speed than the turbine and a fan.

In a further non-limiting embodiment of the foregoing method of adjusting rotational speeds, the geared architecture is a first geared architecture, and the method may include providing a second geared architecture that rotatably couples another turbine and the fan to rotate the fan at a different speed than the other turbine.

In a further non-limiting embodiment of either of the foregoing methods of adjusting rotational speeds, the engine has a three spool architecture, and the turbine is an intermediate turbine.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
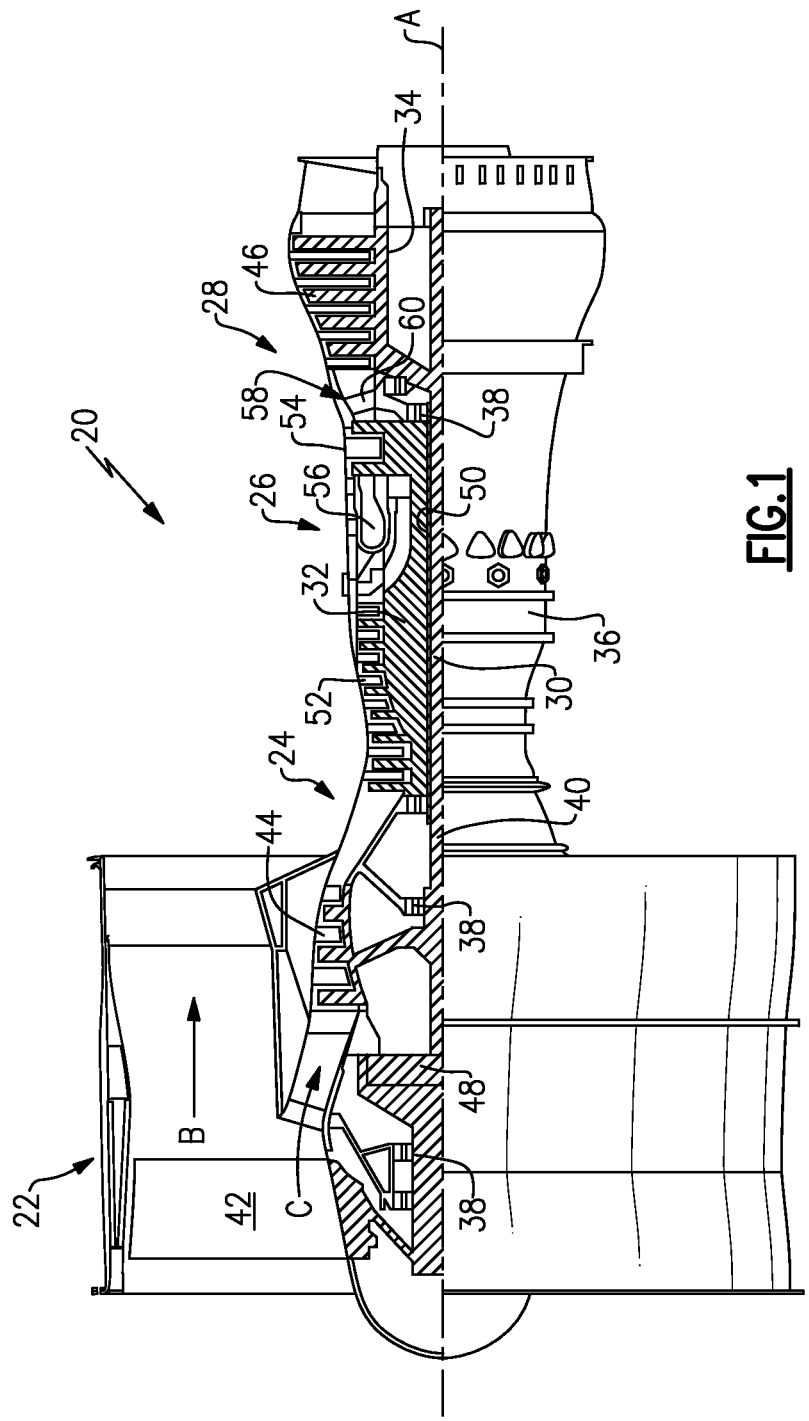
FIG. 1 shows a section view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high temperature exhaust gas stream that expands through the turbine section 28 where energy is extracted and utilized to drive the fan section 22 and the compressor section 24.

Although the disclosed non-limiting embodiment depicts a gas turbine gas turbine engine, it should be understood that the concepts described herein are not limited to use with gas turbines as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a second higher pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first or most forward) compressor section 44 to a low pressure (or second or most rearward) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second or most rearward) compressor section 52 and a high pressure (or first or most forward) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a dual-stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high temperature exhaust gases that are then expanded through the high pressure turbine 54 and low pressure turbine 46. The mid-turbine frame 58 includes vanes 60, which are in the core airflow path and may function as an inlet guide vane for the low pressure turbine 46. Utilizing the vane 60 of the mid-turbine frame 58 as the inlet guide vane for low pressure turbine 46 results in a more axially compact structure and decreases the length of the low pressure turbine 46. For a given rotational speed design limit on the fan 42, the gear 48 enables the low pressure turbine 46 and low pressure compressor 44 to operate at higher speeds reducing the number of stages and corresponding airfoils. Thus, the compactness of the gas turbine engine 20 is increased and a lighter, reduced part count design may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as bucket cruise Thrust Specific Fuel Consumption (TSFC)—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/(518.7° R)]^0.5. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
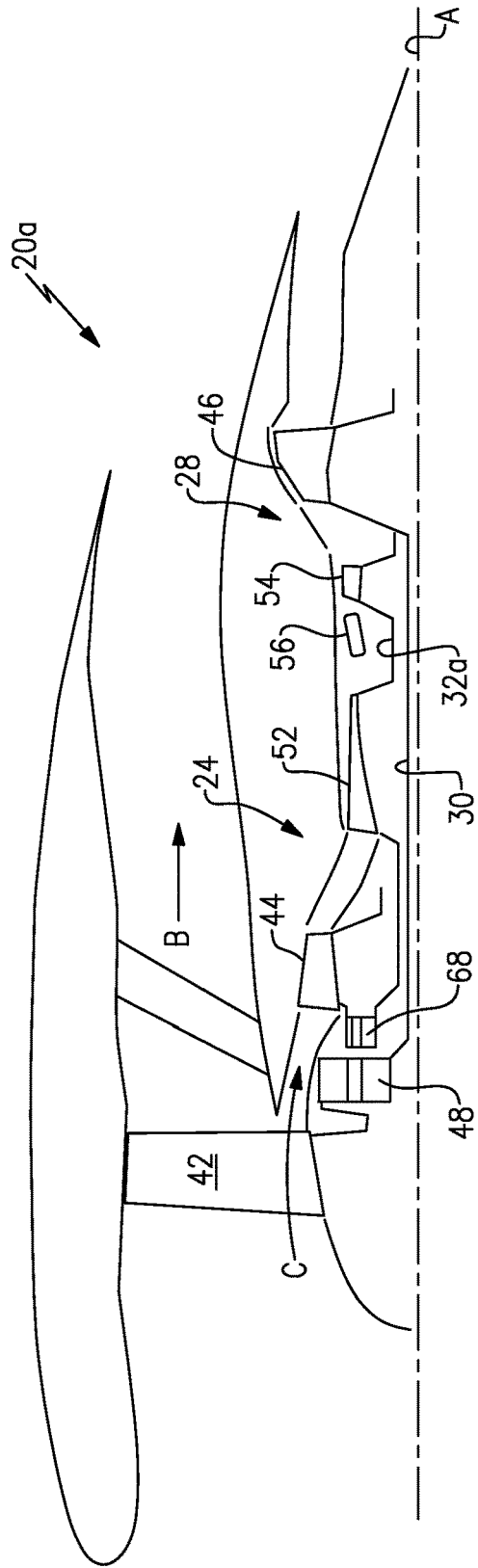
FIG. 2 shows a section view of another example gas turbine engine.

Referring to FIG. 2, in another example engine 20a the geared architecture 48 is a first geared architecture, and the engine 20a further includes a second geared architecture 68. The second geared architecture 68 rotatably couples the high pressure turbine 54 to the low pressure compressor 44. The high pressure turbine 54 directly drives the high pressure compressor 52. The high pressure turbine 54 drives the low pressure compressor 44 through the second geared architecture 68. The second geared architecture 68 allows the low pressure compressor 44 to rotate at a different speed than the high pressure turbine 54, the high pressure compressor 52, or other portions of the high speed spool 32a.

In this example, the second geared architecture 68 is axially upstream from the low pressure compressor 44 relative to a direction of flow through the engine 20a and the free stream flow. This positioning may be used to reduce exposure of the second geared architecture 68 to the relatively high levels of thermal energy areas of the engine 20a closer to the turbine section 28.

Figure 3:
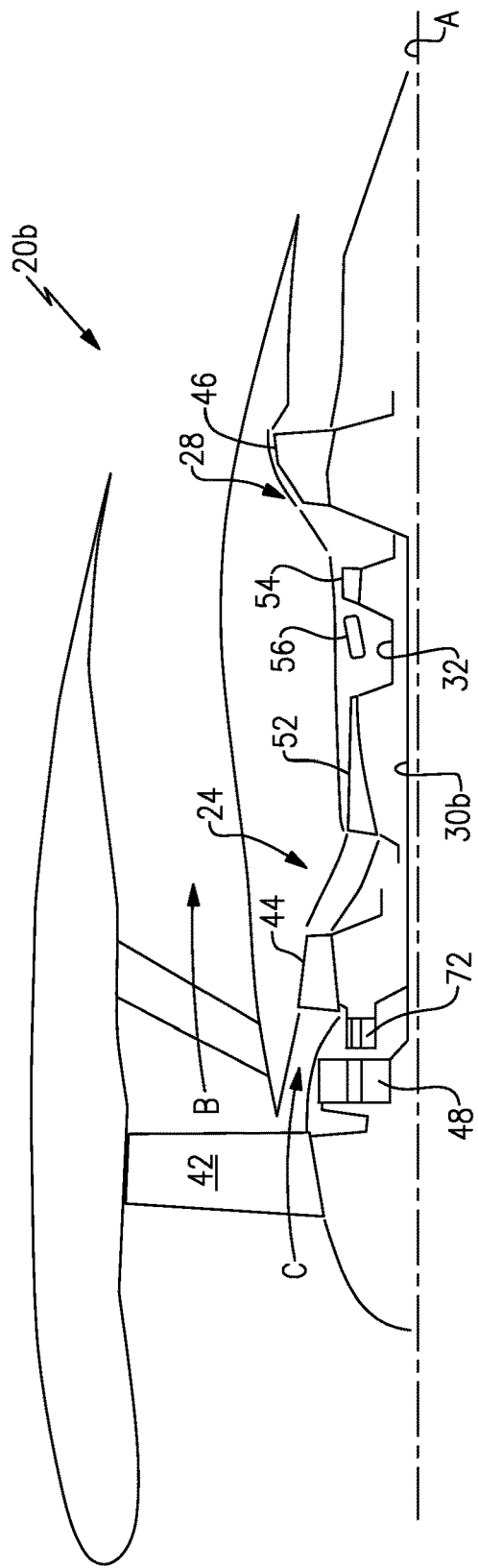
FIG. 3 shows a section view of yet another example gas turbine engine.

Referring now to FIG. 3, in yet another example engine 20b, the geared architecture 48 is a first geared architecture, and the engine 20b includes a second geared architecture 72 that rotatably couples the low pressure turbine 46 to the low pressure compressor 44. The second geared architecture 72 allows the low pressure compressor 44 to rotate at a different speed than the low pressure turbine 46, and other portions of the low speed spool 30b.

Rotating the low pressure compressor 44 at a relatively slower speed may be useful if, for example, because of packaging requirements, the low pressure compressor 44 is placed radially relatively far from the axis A. In such a configuration, rotating the low pressure compressor 44 at a slower speed that the low pressure turbine 46 can facilitate reducing instabilities, especially near the radially outer areas of the low pressure compressor 44. In such a configuration, rotating the low pressure compressor 44 at a slower speed that the low pressure turbine 46 can also facilitate an increased design space for structural, aerodynamic performance or operability trades to be performed.

The second geared architecture 72 is driven by the low speed spool 30b, which also drives the first geared architecture 48 to rotate the fan 42 at a different speed than the low speed spool 30b through the selection of differing gear ratios in components 48 and 72. In another example, the low pressure turbine 46 directly drives the fan 42 and the first geared architecture 48 is omitted from the engine 20b. In such examples, the second geared architecture 72 may be used to rotate the low pressure compressor 44 at either a faster or slower speed the low pressure turbine 46 to facilitate compression.

Figure 4:
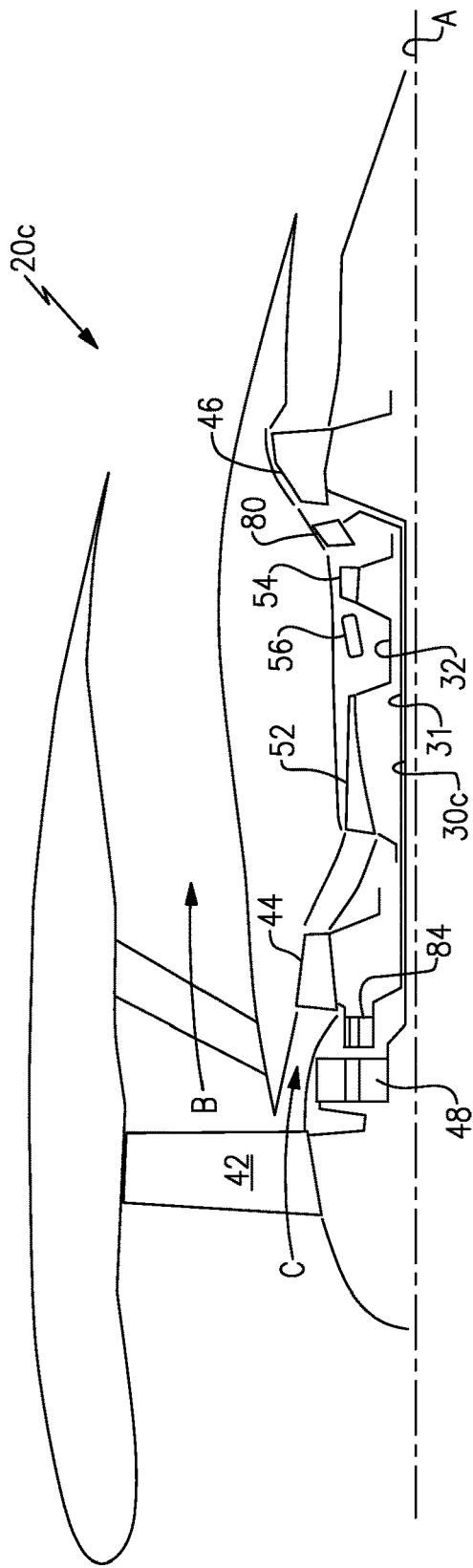
FIG. 4 shows a section view of yet another example gas turbine engine.

Referring now to FIG. 4, yet another example engine 20c has a three-spool configuration. In this example, the low pressure turbine 46 drives the geared architecture 48, which is a first geared architecture, to rotate the fan 42 at a different speed than other portions of the low speed spool 30c. The low pressure turbine 46, in this example, does not drive the low pressure compressor 44. In addition, the high pressure turbine 54 directly drives the high pressure compressor 52 through the high speed spool 32.

The example engine 20c also includes an intermediate pressure turbine 80 that is coupled to the low pressure compressor 44 via a second geared architecture 84 and an intermediate spool 31. The second geared architecture 84 allows the intermediate pressure turbine 80 to rotatably drive the low pressure compressor 44 at a different speed than the intermediate pressure turbine 80. The low pressure compressor 44 may be considered an intermediate compressor as it is rotatably driven by the intermediate pressure turbine 80. The second geared architecture 84, in some examples, is used to increase the rotational speed of the low pressure compressor 44 relative to the intermediate pressure turbine 80, or to slow down the rotational speed of the low compressor 44 relative to the intermediate pressure turbine 80.

Figure 5:
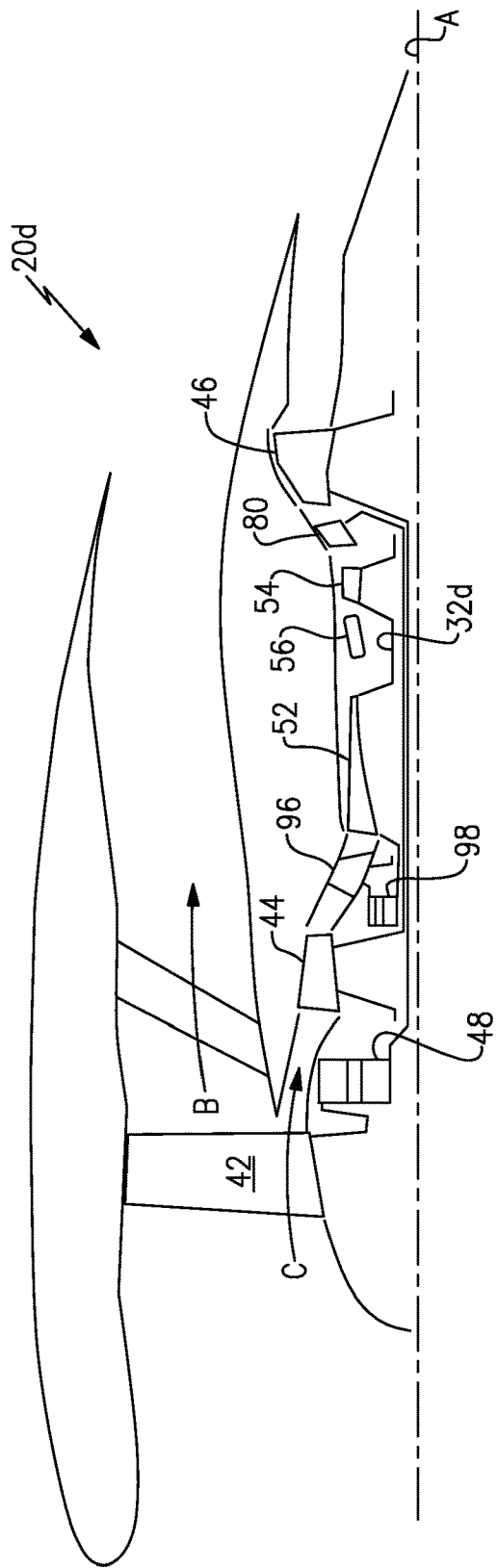
FIG. 5 shows a section view of yet another example gas turbine engine.

Referring now to FIG. 5, yet another example engine 20d has a three-spool configuration and the geared architecture 48 is a first geared architecture. In this example, a second geared architecture 98 rotatably couples the high pressure turbine 54 to an intermediate or "boost" compressor 96. The boost compressor 96 provides compression between the low pressure compressor 44 and the high pressure compressor 52. The compressor 96 is an intermediate or boost compressor due to its location and operation between the low pressure compressor 44 and the high pressure compressor 52.

In the example engine 20d, the high pressure turbine 54 directly drives the high pressure compressor 52 and the boost compressor 96 via the high spool 32d. The second geared architecture 98 enables the high pressure turbine 54 to directly drive the high pressure compressor 52 and to drive the boost compressor 96 at a different rotational speed.

The example engine 20d also includes the intermediate pressure turbine 80 that directly drives the low pressure compressor 44

Figure 6:
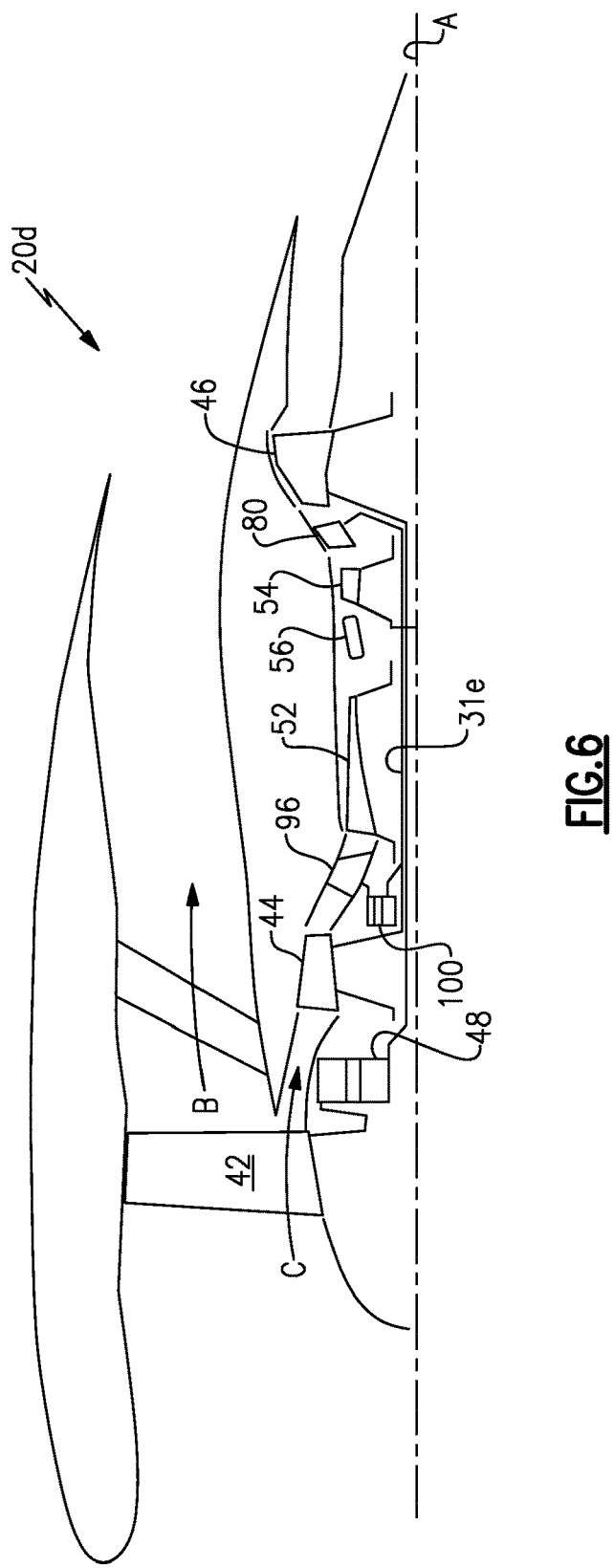
FIG. 6 shows a section view of yet another example gas turbine engine.

Referring to FIG. 6, yet another example engine 20e has a three-spool configuration and the geared architecture 48 is a first geared architecture. In this example, a second geared architecture 100 rotatably couples the intermediate pressure turbine 80 to the intermediate or "boost" compressor 96.

In the example engine 20e, the intermediate pressure turbine 80 directly drives the low pressure compressor 44 and the boost compressor 96 via an intermediate spool 31e. The second geared architecture 100 enables the intermediate pressure turbine 80 to directly drive the low pressure compressor 44 and to drive the boost compressor 96 at a different rotational speed.

The example engine 20e also includes the intermediate pressure turbine 80 that directly drives the low pressure compressor 44

In any of the above example engines 20-20e, the first geared architecture 48 and the second geared architectures, 68, 72, 84, 98, 100 can be used to change the relative directions of rotation (e.g., counterclockwise to clockwise) in addition to changing relative rotational speeds.

In any of the above example engines 20-20e, the first geared architecture 48 may be omitted from the engine 20-20e and the high pressure turbine 46 may directly drive the fan 42.

Features of the disclosed examples include utilizing a geared architecture to step up or step down a rotational input speed from a turbine section. Various advantages, including reduced stage count, reduced airfoil count, compressor stage loading optimization, establishment of rotor speed in recognition of local temperatures for rotor structural stress optimization, and the establishment of flowpath radial elevation desirable to accommodate adjacent components, may be possible by varying the speeds in this way.

The example engines utilize geared architectures to adjust speeds. The geared architecture may include a planetary gear arrangement or a clutch in some examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

Although an example embodiment has been disclosed, a worker of ordinary skill in this art would recognize that certain modifications would come within the scope of this disclosure. For that reason, the following claims should be studied to determine the scope and content of this disclosure.

I claim:

1. A gas turbine engine assembly comprising:
    a geared architecture that rotatably couples a turbine and a compressor of an engine to rotate the compressor at a different speed than the turbine and a fan;
    wherein the turbine is a high pressure turbine, and the geared architecture is a first geared architecture; and
    a second geared architecture rotatably coupled to the fan to rotate the fan at a different speed than a spool that drives the fan.

2. The gas turbine engine assembly of claim 1, wherein the first geared architecture is axially upstream from the compressor relative to a direction of flow through the engine.

3. The gas turbine engine assembly of claim 2, wherein the second geared architecture is axially upstream from the compressor relative to the direction of flow through the engine, and the high pressure turbine directly drives a high pressure compressor.

4. The gas turbine engine assembly of claim 3, wherein the compressor is a low pressure compressor.

5. The gas turbine engine assembly of claim 1, wherein the engine has a three spool architecture.

6. The gas turbine engine assembly of claim 1, wherein the high pressure turbine is rotatably coupled to a high pressure compressor.

7. The gas turbine engine assembly of claim 1, wherein the engine has a three spool architecture.

8. The gas turbine engine of claim 1, further comprising a low pressure turbine that is rotatably coupled to the fan through the second geared architecture.

9. The gas turbine engine assembly of claim 1, wherein the compressor is an intermediate compressor.

10. A gas turbine engine assembly comprising:
    a fan section;
    a turbine section including a high pressure turbine;
    a compressor section including a high pressure compressor and a first compressor upstream of the high pressure compressor;
    wherein the high pressure turbine rotatably drives the high pressure compressor; and
    a geared architecture rotatably coupling the first compressor and the high pressure turbine to drive the first compressor at a different rotational speed than the high pressure turbine; and
    wherein the geared architecture is a first geared architecture, and further including a second geared architecture rotatably coupled to the fan section to rotate the fan section at a different speed than a spool driving the fan section.

11. The gas turbine engine of claim 10, wherein the engine has a three spool architecture.

12. The gas turbine engine assembly of claim 10, wherein the engine has a three spool architecture, and the first compressor is an intermediate compressor that is downstream of a low pressure compressor.

13. The gas turbine engine of claim 10, wherein the first compressor is a low pressure compressor.

14. The gas turbine engine of claim 13, wherein the fan section includes a fan having less than 20 fan blades, the turbine section includes a low pressure turbine that drives the spool, and the low pressure turbine has no more than 6 turbine rotors such that a ratio between a total number of the fan blades and a total number of the turbine rotors is between 3.3 and 8.6.

15. The gas turbine engine of claim 14, further comprising a bypass ratio of greater than 10, and a low fan pressure ratio of less than 1.45, measured across the fan blade alone.

16. The gas turbine engine of claim 15, wherein the high pressure turbine directly drives the high pressure compressor.

17. The gas turbine engine of claim 16, further comprising a mid-turbine frame between the low pressure turbine and the high pressure turbine, and the mid-turbine frame supports a bearing system and includes vanes in a core flow path upstream of the low pressure turbine.

* * * * *